US006549581B1

United States Patent
Izumi

(10) Patent No.: US 6,549,581 B1
(45) Date of Patent: Apr. 15, 2003

(54) TRANSMITTER AND METHOD TO CANCEL INTERFERENCE IN OFDM COMMUNICATION

(75) Inventor: Seiichi Izumi, Fellbach (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/330,328

(22) Filed: Jun. 11, 1999

(30) Foreign Application Priority Data

Jun. 15, 1998 (EP) .............................................. 98110931
Nov. 26, 1998 (EP) .............................................. 98122469

(51) Int. Cl.[7] .............................. H04L 27/28; H04K 1/10
(52) U.S. Cl. ......................... 375/260; 375/295; 370/208
(58) Field of Search ................................. 370/203, 208; 708/514, 520; 375/259, 260, 285, 295

(56) References Cited

U.S. PATENT DOCUMENTS 5,946,038 A * 8/1999 Kalker ........................ 348/397

* cited by examiner

Primary Examiner—Jean Corrielus
(74) Attorney, Agent, or Firm—Frommer Lawrence & Haug LLP; William S. Frommer; Samuel H. Megerditchian

(57) ABSTRACT

According to the present invention a transmitter for the wireless transmission of information data for example according to the OFDM system is provided. The transmitter comprises a random orthogonal transform (9) for random orthogonal transforming (ROT) of blocks of data to be transmitted by a multiplication of a symbol vector (26) comprising the data of one block, with a matrix (29). Furthermore up conversion element for transmission of data originating from the ROT (9) for random orthogonal transforming (ROT) are provided. According to the invention, the matrix operation uses a matrix (29) comprising n orthogonal columns, wherein n is the number of data samples comprised in one of said blocks, for example the number n used for the following IFFT procedure (10). The number of rows of said matrix (29) is larger than the number of said columns of said matrix (29). According to a further aspect of the present invention, a plurality of mutually orthogonal matrices are used in one base station. With other words, a plurality of orthogonal matrices are allocated to the same base station. The frequency band of OFDM can the be divided by these orthogonal matrices. Therefore, according to this aspect of the present invention, a multiple access technique in OFDM is provided.

22 Claims, 15 Drawing Sheets

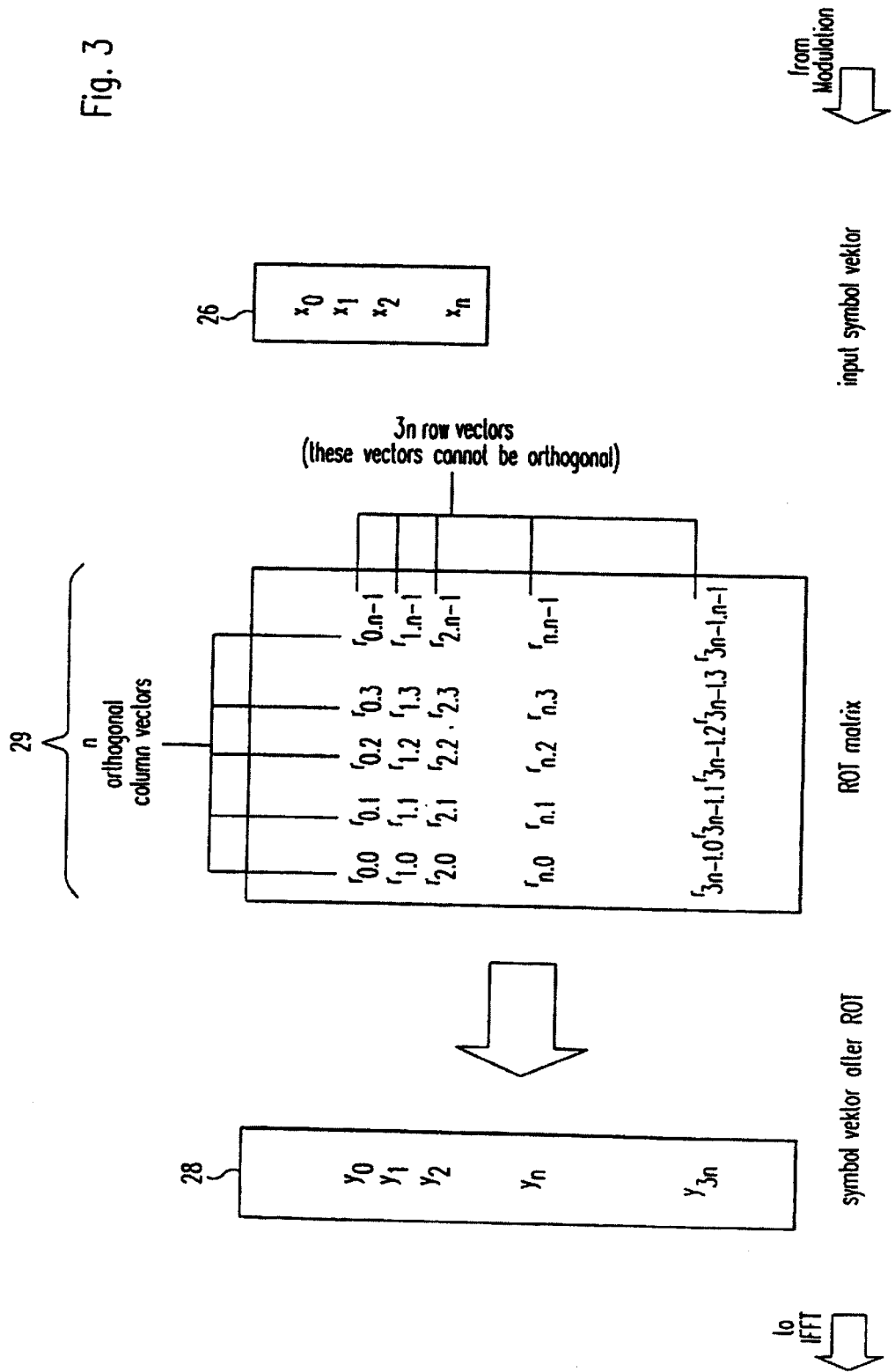

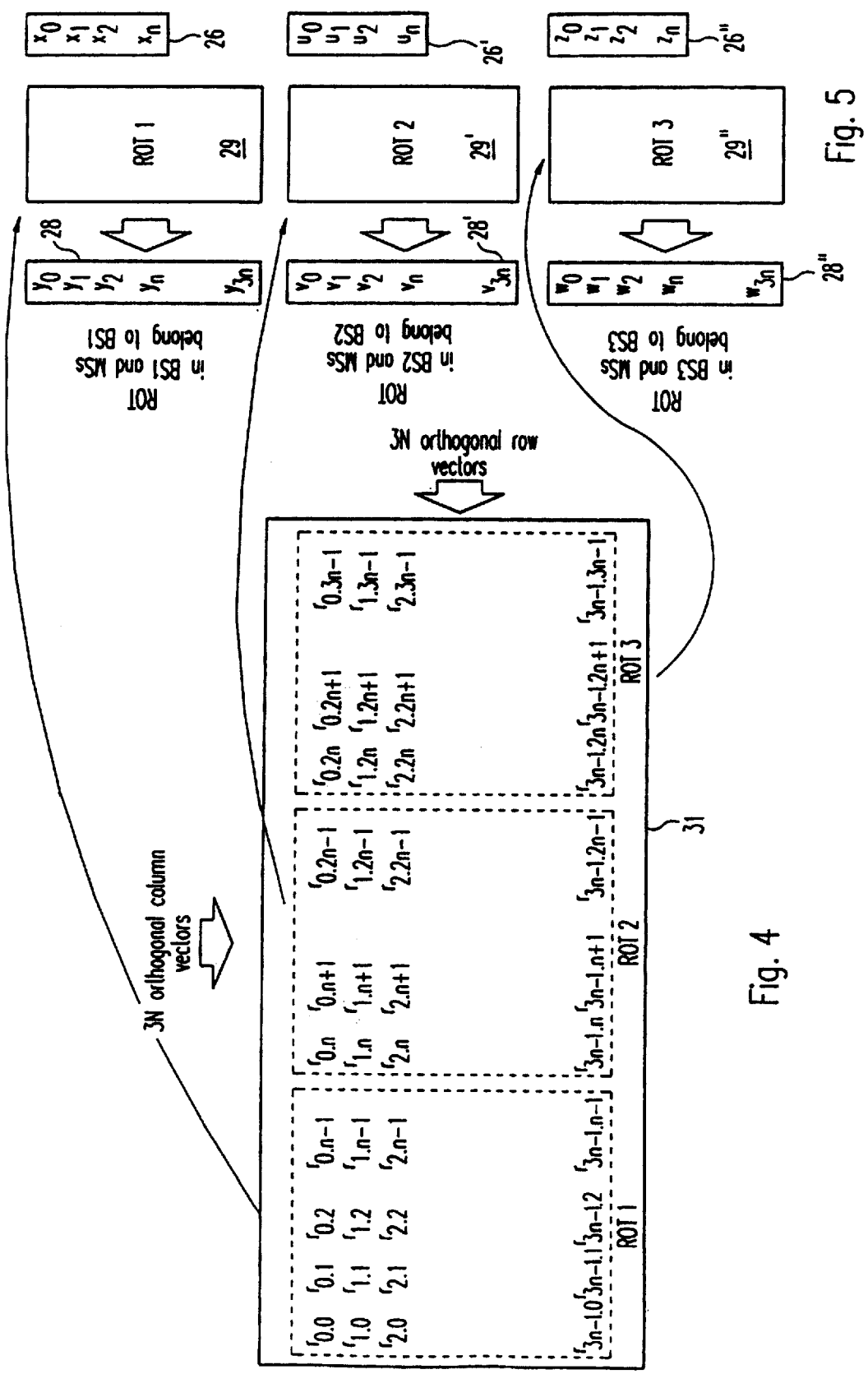

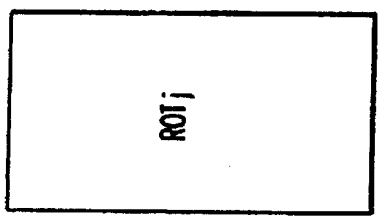
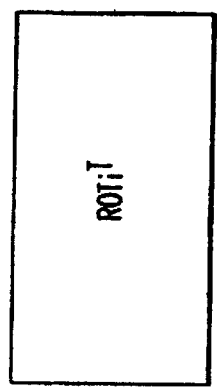
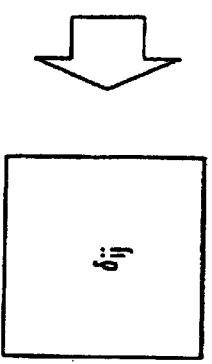
Fig. 7
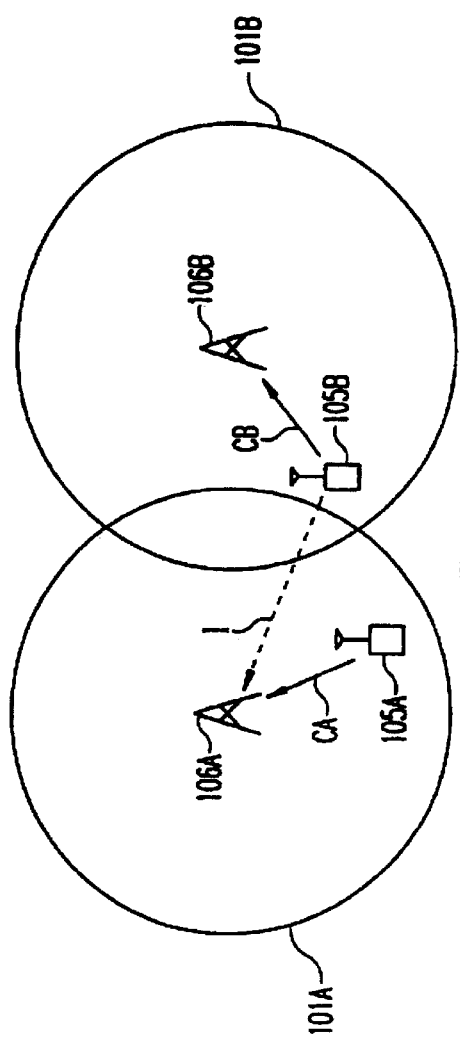
Fig. 8
(PRIOR ART)

$$xA = \begin{bmatrix} x_0 & x_1 & x_2 & x_3 & x_4 & x_5 & x_6 & x_7 & x_8 & x_9 & x_{10} & x_{11} \end{bmatrix} \begin{bmatrix} a_2 a_1 a_0 & 0 & 0 & 0 & 0 & 0 & a_1 a_0 & 0 & 0 & a_0 & 0 & a_2 a_1 \\ 0 & 0 & 0 & 0 & 0 & 0 & 0 & 0 & 0 & a_2 & 0 & 0 \\ 0 & a_2 a_1 a_0 & 0 & 0 & 0 & 0 & 0 & 0 & 0 & a_2 a_1 a_0 & 0 & 0 \\ 0 & 0 & 0 & a_2 a_1 a_0 & 0 & 0 & 0 & 0 & 0 & 0 & 0 & 0 \\ 0 & 0 & 0 & 0 & 0 & a_2 a_1 a_0 & 0 & 0 & 0 & 0 & 0 & 0 \\ 0 & 0 & 0 & 0 & 0 & 0 & a_2 a_1 a_0 & 0 & 0 & 0 & 0 & 0 \\ 0 & 0 & 0 & 0 & 0 & 0 & 0 & 0 & a_2 a_1 a_0 & 0 & 0 & 0 \\ 0 & 0 & 0 & 0 & 0 & 0 & 0 & 0 & 0 & 0 & a_2 a_1 a_0 & 0 \end{bmatrix}$$

$$
\begin{bmatrix}
0 & 0 & 0 & & & & & & & & & & & \\
0 & 0 & 0 & & & & & & & & & & & \\
a_2 a_1 a_0 & & & & & & & & & & & & & \\
& 0 & 0 & & & & & & & & & & & \\
& a_1 a_0 & 0 & 0 & 0 & & & & & & & & & \\
& & a_2 a_1 a_0 & & & & & & & & & & & \\
& & & 0 a_0 & 0 & 0 & & & & & & & & \\
& & & a_2 & 0 & 0 & 0 & & & & & & & \\
& & & & a_2 a_1 a_0 & & & & & & & & & \\
& & & & & 0 & 0 & 0 & & & & & & \\
& & & & & 0 & 0 & 0 & & & & & & \\
& & & & & a_2 a_1 a_0 & & & & & & & & \\
& & & & & & 0 & 0 & 0 & & & & & \\
& & & & & & 0 & 0 & 0 & & & & & \\
& & & & & & a_2 a_1 a_0 & & & & & & & \\
& & & & & & & 0 & 0 & 0 & & & & \\
& & & & & & & 0 & 0 & 0 & & & & \\
& & & & & & & a_2 a_1 a_0 & & & & & & \\
& & & & & & & & 0 & 0 & & & & \\
& & & & & & & & a_2 a_1 & 0 & 0 & & & \\
& & & & & & & & & a_2 & & & &
\end{bmatrix}
=
\begin{bmatrix}
0 0 a_2 & 0 0 a_1 & 0 0 a_0 & & & & & & & \\
0 0 a_1 & 0 0 a_0 & 0 & & & & & & & \\
0 0 a_0 & 0 & 0 & & & & & & & \\
& 0 0 a_2 & 0 0 a_1 & 0 0 a_0 & & & & & & \\
& 0 0 a_1 & 0 0 a_0 & 0 & & & & & & \\
& 0 0 a_0 & 0 & 0 & & & & & & \\
0 a_1 & 0 0 a_2 & 0 0 a_1 & 0 0 a_0 & & & & & & \\
a_0 & 0 0 a_1 & 0 0 a_0 & 0 & & & & & & \\
& 0 0 a_0 & 0 & 0 & & & & & & \\
0 a_1 & 0 0 a_2 & 0 0 a_1 & 0 0 a_0 & & & & & & \\
a_0 & 0 0 a_1 & 0 0 a_0 & 0 & & & & & & \\
& 0 0 a_0 & 0 & 0 & & & & & & \\
a_2 a_1 & & & & & & & & &
\end{bmatrix}
\cdot
\begin{bmatrix}
1 0 0 \\
0 1 0 \\
0 0 1 \\
1 0 0 \\
0 1 0 \\
0 0 1 \\
1 0 0 \\
0 1 0 \\
0 0 1
\end{bmatrix}
$$

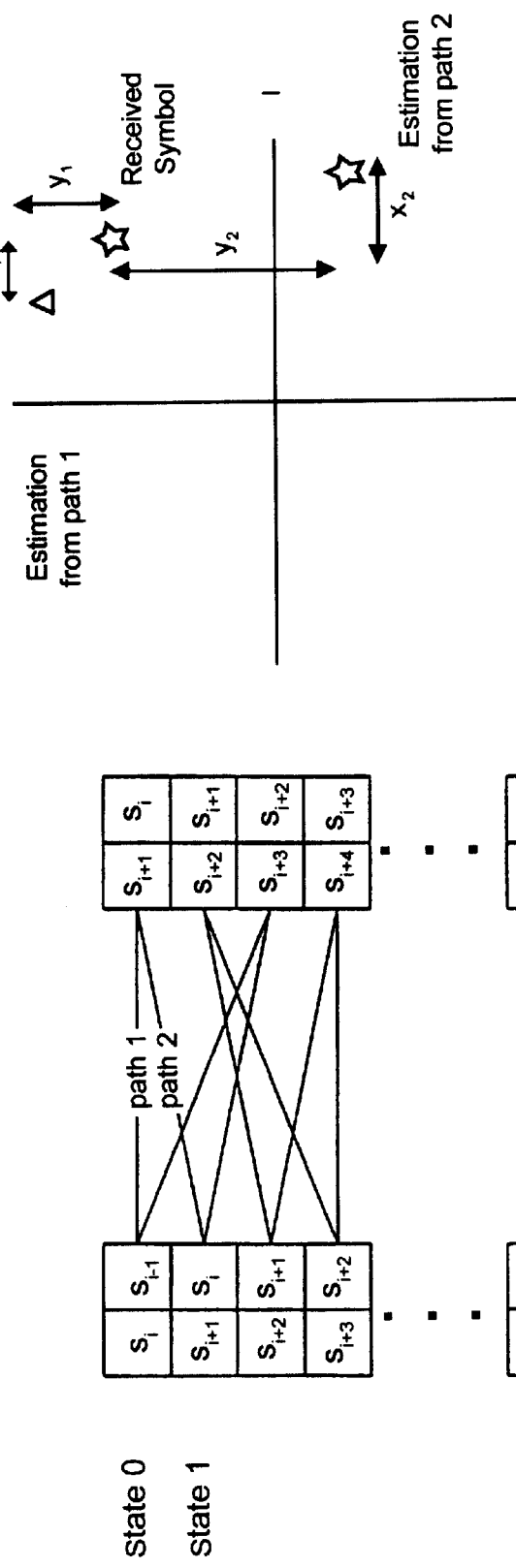

ively portable telephone device. Reference numerals 106A
TRANSMITTER AND METHOD TO CANCEL INTERFERENCE IN OFDM COMMUNICATION

FIELD OF THE INVENTION

The present invention relates to a transmitter and a method as well as to a transmitting system for the wireless transmission of informational data and particularly to a technique for interference cancellation in OFDM communication.

BACKGROUND OF THE INVENTION

One technique to minimize interference in wireless transmission, particularly in OFDM systems, is the so-called random orthogonal transform (ROT). The principles of ROT are described in the European patent application 98 104 287.2 of Sony Corporation which is only to be regarded to be prior art according to Article 54(3) EPC. The enclosure of said application is herewith incorporated by reference. In the following, the basic technique according to this application will be explained in detail with reference to FIGS. 8 to 10.

In FIG. 8, reference numerals 105A, 105B denote respectively portable telephone device. Reference numerals 106A and 106B denote base stations of a wireless transmission system. As shown in FIG. 8, the portable telephone device 105A uses a predetermined channel to be engaged in radio communication with the base station 106A in the cell 101A. At the same time, the same channel is used in the adjacent cell 101B so that the portable telephone device 105B is engaged in radio communication with the base station 106B. At that time, for example, in the portable telephone devices 105A and 105B both QPSK modulation (Quadrature Phase Shift Keying; Four Phase Transition Modulation) is used as a modulation method of the sent data. The signal series of the modulated sending signal are defined as $x^{(A)}_2$, modulated sending signal are defined as $x^{(A)}_1, x^{(A)}_2, x^{(A)}_3, \ldots x^{(A)}_{k-1}, x^{(A)}_k, x^{(A)}_{k+1}, \ldots$ and $x^{(B)}_1, x^{(B)}_2, x^{(B)}_3, \ldots x^{(B)}_{k-1}, x^{(B)}_k, x^{(B)}_{k+1}, \ldots$ The portable telephone device 102A groups N (N is an integer which is 1 or more) sending signal series $x^{(A)}_n$ (n=1, 2, 3, . . . ). The grouped sending signal series $x^{(A)}_k, \ldots x^{(A)}_{k+N}$ and a predetermined Nth normal orthogonal matrix $M_A$ are multiplied in order as shown in the following equation.

[Equation 1]

$$\begin{bmatrix} y^{(A)}_k \\ \vdots \\ y^{(A)}_{k+N} \end{bmatrix} = M_A \begin{bmatrix} x^{(A)}_k \\ \vdots \\ x^{(A)}_{k+N} \end{bmatrix} \quad (1)$$

As a consequence, an orthogonal conversation is added to the sending signal series $x^{(A)}_n$ (n=1, 2, 3, . . . ) and a resulting sending signal series $y^{(A)}_n$ (n=1, 2, 3, . . . ) are sent in order.

On the other hand, at the base station 106A which is a receiving side, when a sending signal CA is received from the portable telephone device 105A of the communication partner, N received signal series $y^{(A)}_n$ (n=1, 2, 3, . . . ) are grouped, and the grouped received signal series $y^{(A)}_k, \ldots y^{(A)}_{k+N}$ are successively multiplied with an inverse matrix $M_{A-1}$ of the Nth normal orthogonal matrix $M_A$ used on the sending side as shown in the following equation.

[Equation 2]

$$\begin{bmatrix} X^{(A)}_k \\ \vdots \\ X^{(A)}_{k+N} \end{bmatrix} = M_A^{-1} \begin{bmatrix} y^{(A)}_k \\ \vdots \\ y^{(A)}_{k+N} \end{bmatrix} \quad (2)$$

$$= M_A^{-1} M_A \begin{bmatrix} x^{(A)}_k \\ \vdots \\ x^{(A)}_{k+N} \end{bmatrix} = \begin{bmatrix} x^{(A)}_k \\ \vdots \\ x^{(A)}_{k+N} \end{bmatrix}$$

As a consequence, the signal series $X^{(A)}_n$ (n=1, 2, 3, . . . ) is restored which is equal to the signal series $x^{(A)}_n$ (n=1, 2, 3, . . . ) before orthogonal conversion.

In the similar manner, at the time of sending data, the portable telephone device 105B groups the N sending signal series $x^{(B)}_n$ (n=1, 2, 3, . . . ). The grouped sending signal series $x^{(B)}_k, \ldots X^{(B)}_{k+N}$ and the predetermined Nth normal orthogonal matrix $M^B$ are multiplied in order for each group as shown in the following equation.

[Equation 3]

$$\begin{bmatrix} y^{(B)}_k \\ \vdots \\ y^{(B)}_{k+N} \end{bmatrix} = M_B \begin{bmatrix} x^{(B)}_k \\ \vdots \\ x^{(B)}_{k+N} \end{bmatrix} \quad (3)$$

As a consequence, the orthogonal conversion is added to the sending signal series $x^{(B)}_n$ (n=1, 2, 3, . . . ), and the resulting sending signal series $y^{(B)}_n$ (n=1, 2, 3, . . . ) are sent in order. For reference, the Nth normal orthogonal matrix $M_B$ which is used in the portable telephone device 5B and the Nth normal orthogonal matrix $M_A$ which is used in the portable telephone device 105A are matrixes which are completely different from each other.

At the base station 106B which is a receiving side, when the sending signal CB from the portable telephone device 5B of the communication partner is received, the N received receiving signal series $y^{(B)}_n$ (n=1, 2, 3, . . . ) are grouped, and the grounded $y^{(B)}_k, \ldots y^{(B)}_{k+N}$ and the inverse matrix $M_B^{-1}$ of the Nth normal orthogonal matrix $M_B$ used at a sending side are multiplied in order for each group as shown in the following equation.

[Equation 4]

$$\begin{bmatrix} X^{(B)}_k \\ \vdots \\ X^{(B)}_{k+N} \end{bmatrix} = M_B^{-1} \begin{bmatrix} y^{(B)}_k \\ \vdots \\ y^{(B)}_{k+N} \end{bmatrix} \quad (4)$$

$$= M_B^{-1} M_B \begin{bmatrix} x^{(B)}_k \\ \vdots \\ x^{(B)}_{k+N} \end{bmatrix} = \begin{bmatrix} x^{(B)}_k \\ \vdots \\ x^{(B)}_{k+N} \end{bmatrix}$$

Consequently, the signal series $X^{(B)}_n$ (n=1, 2, 3, . . . ) which is equal to the signal series $x^{(B)}_n$ (n=1, 2, 3, . . . ) which is equal to the signal series $x^{(B)}_n$ (n=1, 2, 3, . . . ) before the orthogonal conversion is restored.

By the way, at the base station 106A, only the sending signal CA sent by the portable telephone device 105A reaches, but the sending signal CB sent by the portable telephone device 105B also reaches depending on the situation. In that case, the sending signal CB from the portable telephone device 105B acts as an interference wave I. When the signal level of the sending signal CB is large as compared with the sending signal CA from the portable telephone device 105A, trouble is caused to communication with the portable telephone device 105A. In other words, as the base station 106A, it is not recognized that the signal is a sending signal from either of the portable telephone devices 105A or 105B so that it is feared that the sending signal CB form the portable telephone device 105B is received by mistake.

In such a case, the base station 6A groups the N received signal series $y^{(B)}_n$ (n=1, 2, 3, ...) received from the portable telephone device 5B so that the demodulation processing is performed by multiplying the inverse matrix $M_A^{-1}$ to the grouped signal series $y^{(B)}_k, \ldots y^{(B)}_{k+N}$ as shown in the following equation as in the normal receiving processing.
[Equation 5

$$\begin{bmatrix} X^{(A)}_k \\ \vdots \\ X^{(A)}_{k+N} \end{bmatrix} = M_A^{-1} \begin{bmatrix} y^{(B)}_k \\ \vdots \\ y^{(B)}_{k+N} \end{bmatrix} = M_A^{-1} M_B \begin{bmatrix} X^{(B)}_k \\ \vdots \\ X^{(B)}_{k+N} \end{bmatrix} \quad (5)$$

However, as seen from the equation (5), the receiving signal series $y^{(B)}_n$ (n=1, 2, 3, ...) from the portable telephone device 5B is a result obtained from a multiplication of the orthogonal matrix $M_B$ which is different from the orthogonal matrix $M_A$ so that the diagonal reverse conversion is not obtained even when the inverse matrix $M_A^{-1}$ is multiplied with the result that the original signal series $x^{(B)}_n$ (n=1, 2, 3, ...) is not restored. In this case, the received signal series becomes a signal series which is the original signal series $x^{(B)}_n$ (n=1, 2, 3, ...) orthogonally converted with another orthogonal matrix consisting of $M_A^{-1}M_B$, so that the signal becomes ostensibly a noise signal, and even when the signal series is QPSK demodulated, the sending data of the portable telephone device 5B is not restored.

In this manner, in the case of the radio communication system to which the present invention is applied, the orthogonal matrix which is different for each communication at the sending side is multiplied with the signal series. On the receiving side, the received signal series is multiplied with the inverse matrix of the orthogonal matrix which is used on the sending side (namely, the communication partner of its own station) so that the original signal series before the orthogonal conversion is restored. As a consequence, even when the same channel is used in the other communication, the restoration of the sent signal series by the other communication is avoided in advance with the result that the leakage of the data sent in the other communication can be avoided in advance.

For reference, there is described here that the leakage problem is avoided when the sending signal CB of the portable telephone device 105B is received by the base station 106A. For the same reason, the leakage problem can be also avoided even when the base station 106B receives the sending signal CA of the portable telephone device 105A.

Here, the orthogonal conversion using the orthogonal matrix and the inverse conversion thereof will be explained by using the signal transition view. In the beginning, the sending signal series $x^{(A)}_n$ (n=1, 2, 3, ...) of the portable telephone device 105A is QPSK modulated so that the, π/4, 3π/4, 5π/4 or 7π/4 phase states can be assumed. As a consequence as shown in FIG. 9A, on the complex surface (IQ surface), the phase state is present at a position where the phase state becomes π/4, 3/π4, 5π/4 or 7π/4. When such sending signal series $x^{(A)}_n$ (n=1, 2, 3, ...) is multiplied to the Nth normal orthogonal matrix $M_A$, the resulting signal series $y^{(A)}_n$ (n=1, 2, 3, ...) becomes a random state as shown in FIG. 9B.

On the other hand, at the base station 105A which is a receiving side, this signal series $y^{(A)}_n$ (n=1, 2, 3, ...) is received. As described above, when the inverse matrix $M_A^{-1}$ the orthogonal matrix $M_A$ which is used on the sending side is multiplied with this signal series $y^{(A)}_n$ (n=1, 2, 3, ...), the resulting signal series $X^{(A)}_n$ (n=1, 2, 3, ...) becomes the same as the original signal series $x^{(A)}_n$ (n=1, 2, 3, ...) as shown in FIG. 9C so that the resulting signal series is brought back to the position of the phase state comprising π/4, 3π/4, 5π/4 or 7π/4 on the complex surface. Consequently, when the signal series $X^{(A)}_n$ (n=1, 2, 3, ...) is subjected to QPSK demodulation, the sending data from the portable telephone device 105A can be accurately restored.

Furthermore, since the sending signal series $x^{(B)}$ (n=1, 2, 3, ...) of the portable telephone device 105B is also QPSK modulated, π/4, 3π/4, 5π/4 or 7π/4 phase state is assumed with the result that the phase is present on the position comprising π/4, 3π/4, 5π/4 or 7π/4 on the complex surface as shown in FIG. 10A. When such sending signal series $x^{(B)}_n$ (n 1, 2, 3, ...) is such that the phase state becomes random as shown in FIG. 10B.

In the case where such signal series $y^{(B)}_n$ (n=1, 2, 3, ...) is received with the base station 106A which is not the communication partner, the signal series $y^{(B)}_n$ (n=1, 2, 3, ...) becomes an interference wave for the base station 106A. However, the base station 106A does not recognize that the signal series is either the sending signal from the communication partner or the interference wave, the demodulation processing is performed as in the normal receiving processing. However, even when the inverse matrix $M_A^{-1}$ of the orthogonal matrix $M_A$ is multiplied with this signal series $y^{(B)}_n$ (n=1, 2, 3, ...), the inverse matrix $M_A^{-1}$ is not the inverse matrix of the orthogonal matrix $M_B$ which is used at the sending time. As shown in FIG. 10C, the phase state is not brought back to the original state so that the phase state becomes a random state. Consequently, even when the signal series shown in FIG. 10C is QPSK demodulated, the sending data from the portable telephone device 105B is not restored.

Though the randomizing according to ROT provides for an minimization of interference effects by the randomizing procedure, the interference is not canceled totally as this the case e.g. in TDMA, furthermore, as in OFDM systems usually no training sequence or midamble is used, the distinction between a wanted and an unwanted signal generally is difficult.

OBJECTS AND SUMMARY OF THE INVENTION

Therefore it is the object of the present invention to provide for a technique which allows a more efficient interference cancellation in OFDM systems.

According to the present invention a transmitter for the wireless transmission of information data is provided. The transmitter comprises means for random orthogonal transforming (ROT) of blocks of data to be transmitted, by a multiplication of a vector comprising the data of one block with a matrix. Furthermore means for the transmission of data originating from the means for random orthogonal transforming are provided. The matrix operation uses a matrix comprising n orthogonal columns, n being the number of data samples comprised in one of said blocks. According to the present invention the number of rows of said matrix is larger than the number of said columns of said matrix. Note: Generally, when the input data are represented as a row vector, the ROT matrix has more columns than rows, and when the input data are represented as a column vector, the ROT matrix has more rows than columns. Therefore, according to the present invention an oblong matrix is provided (in contrast to the square matrix according to the prior art).

The number of rows of said matrix can be equal to M*n, n being the number of columns of said matrix and M being an integer larger than 1.

A modulator can be provided outputting said blocks of data being supplied to said means for random orthogonal transforming.

The means for random orthogonal transforming can supply the transformed data to an inverse fast Fourier transform (IFFT) circuit.

As another aspect of the present invention, the transmitter is a transmitter of the OFDM type. The means for random orthogonal transforming of blocks of data to be transmitted are provided with a plurality of mutually orthogonal matrices to provide for a frequency band division according to the OFDM system. Therefore according to this aspect, a multiple access technique for OFDM systems is provided still efficiently minimizing interference effects.

The transmitter can comprise a convolution encoder, wherein the convolution encoder is implemented by reconstructing the matrix from a convolution code matrix.

In this case the elements of the matrix are coefficients of polynomials of a convolutional function of the convolution encoder.

The coefficients of the polynomials can be shift in each column vector of the matrix implementing the convolution encoder.

The transmitter can furthermore comprise means for inverse random orthogonal transforming of blocks of data received by multiplying a received data block by a transpose matrix of the matrix used for the data to be transmitted.

Alternatively to the transpose matrix multiplication the transmitter can comprise means for inverse random orthogonal transforming an convolutional decoding blocks of data received by applying a Trellis decoding technique.

Said means for inverse random orthogonal transforming an convolutional decoding of blocks of data received can comprise means for calculating an equivalent vector of a received symbol, means for generating a Trellis state matrix on the basis of the elements of the equivalent vector, means for calculating path matrix and adding up the calculated path matrix with original state matrix, and means for deciding the decoded symbol by comparing the path matrix of the two paths leading respectively to a new state.

According to the present invention furthermore a transmitting system is provided comprising a plurality of base stations and a plurality of mobile stations. Thereby each mobile station and base station, respectively, comprises a transmitter with the features as set forth above.

According to the present invention furthermore a method for the wireless transmission of information data is provided. Blocks of data to be transmitted are processed by a random orthogonal transformation by means of a multiplication of a vector comprising the data of one block with the matrix. The data originating from the step of random orthogonal transforming are then transmitted. Thereby the matrix operation uses a matrix comprising n orthogonal columns, n being the number of data samples comprised in one of set blocks, wherein the number of rows of said matrix is larger than the number of said columns of said matrix.

According to the present invention furthermore a method for the generation of matrices to be used for the random orthogonal transformation of blocks of data in a wireless transmission chain is provided. Thereby a square matrix with orthogonal column vectors and orthogonal row vectors is provided. The square matrix is divided to great M matrices the number of rows of each of that matrices being equal to M*n, n being the number of columns of each of that matrices and M being an integer larger than one. Each of that M matrices is than allocated to a transmitter in a transmission chain.

BRIEF DESCRIPTION OF THE DRAWINGS

Further advantages, objects and features of the present invention will come clearer from the following description of preferred embodiments of the present invention taken in conjunction with the annexed drawings.

FIG. 3 shows a matrix operation for ROT according to the present invention, FIG. 4 and FIG. 5 show the generation and allocation of ROT-matrices to different base stations, FIG. 7 shows the result of the matrix-multiplication of orthogonal matrices, FIG. 8 shows a system structural view explaining a principle being the base of the present invention, FIG. 12 shows the use of a ROT matrix for a convolutional coding, FIGS. 13 and 14 show the generation of a ROT matrix reconstructed from a convolution coding matrix and the division of said ROT matrix into three parts, FIG. 16 shows the multiplication of a ROT matrix with the transpose of said ROT matrix, FIG. 17 shows the multiplication of a ROT matrix with the transpose of a matrix orthogonal to said ROT matrix, FIG. 18 shows the generation of an equivalent vector on the basis of a multiplication of an input symbol and a ROT matrix, which equivalent vector is used for a convolutional coding/decoding, FIG. 19 shows a Trellis state matrix, FIG. 20 shows schematically the calculation of path metrics.

DETAILED DESCRIPTION OF THE INVENTION

Figure 1:
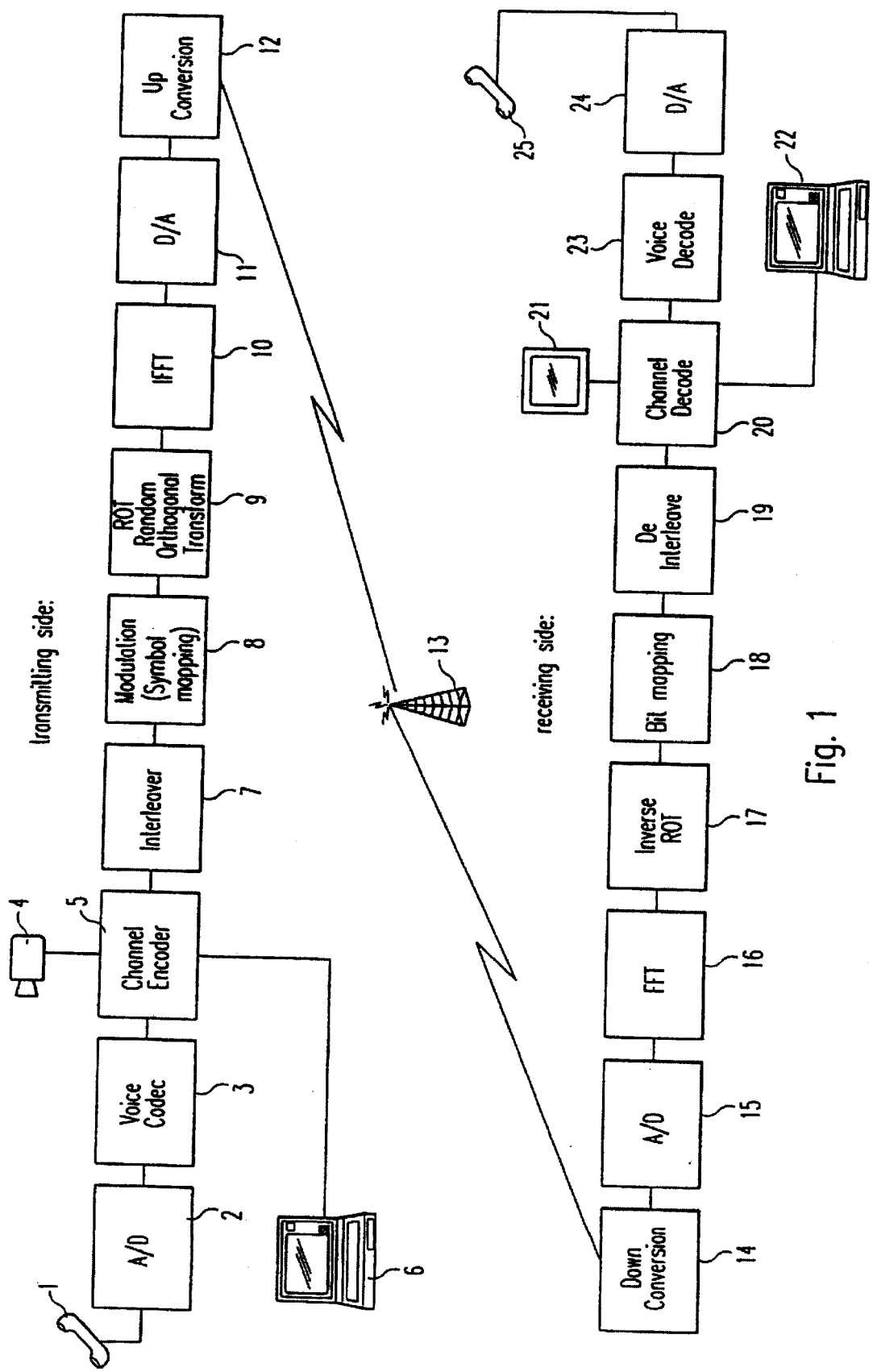
FIG. 1 shows an overall view of a transmission system according to the present invention.

With reference to FIG. 1 the general structure of a transmission system according to the present invention will now be explained. Voice date for example from a hand set 1 are passed through A/D converter 2 and then supplied to a voice codec 3. The output of the voice codec 3 is supplied to a channel encoder 5. Alternatively or additionally other data, such as video data from a camera 4 or data from a laptop computer 6 can be input to the channel encoder 5. The channel encoder data are passed through an interleaver 7 and then given to a modulator 8 effecting the symbol mapping. The modulated date are then given to a random orthogonal transform (ROT) circuit 9 outputting transformed data to an inverse fast Fourier transformation (IFFT) circuitry 10. The output data from the IFFT 10 D/A converted 11 and then wirelessly transmitted 13 once they are upconverted 12. At the receiving side the wirelessly transmitted data are downconverted 14 A/D converted 15, past through a fast Fourier transformation circuit 16. The output data from the FFT 16 are then processed by an inverse ROT process 17. The output data from the inverse ROT circuitry 17 is passed through a bit mapping circuitry 18, a deinterleaver 19 and then supplied to a channel decoder 20. The channel decoder 20 optionally outputs decoded data to a monitor 21 (in case of video data), to a laptop computer 22 or to a voice decoder 23, a D/A converter 24 and the hand set 25 in case of voice data. The object of the present invention particularly lies in the procedures as they are effected by the ROT circuit 9 and the inverse ROT circuit 17.

Figure 2:
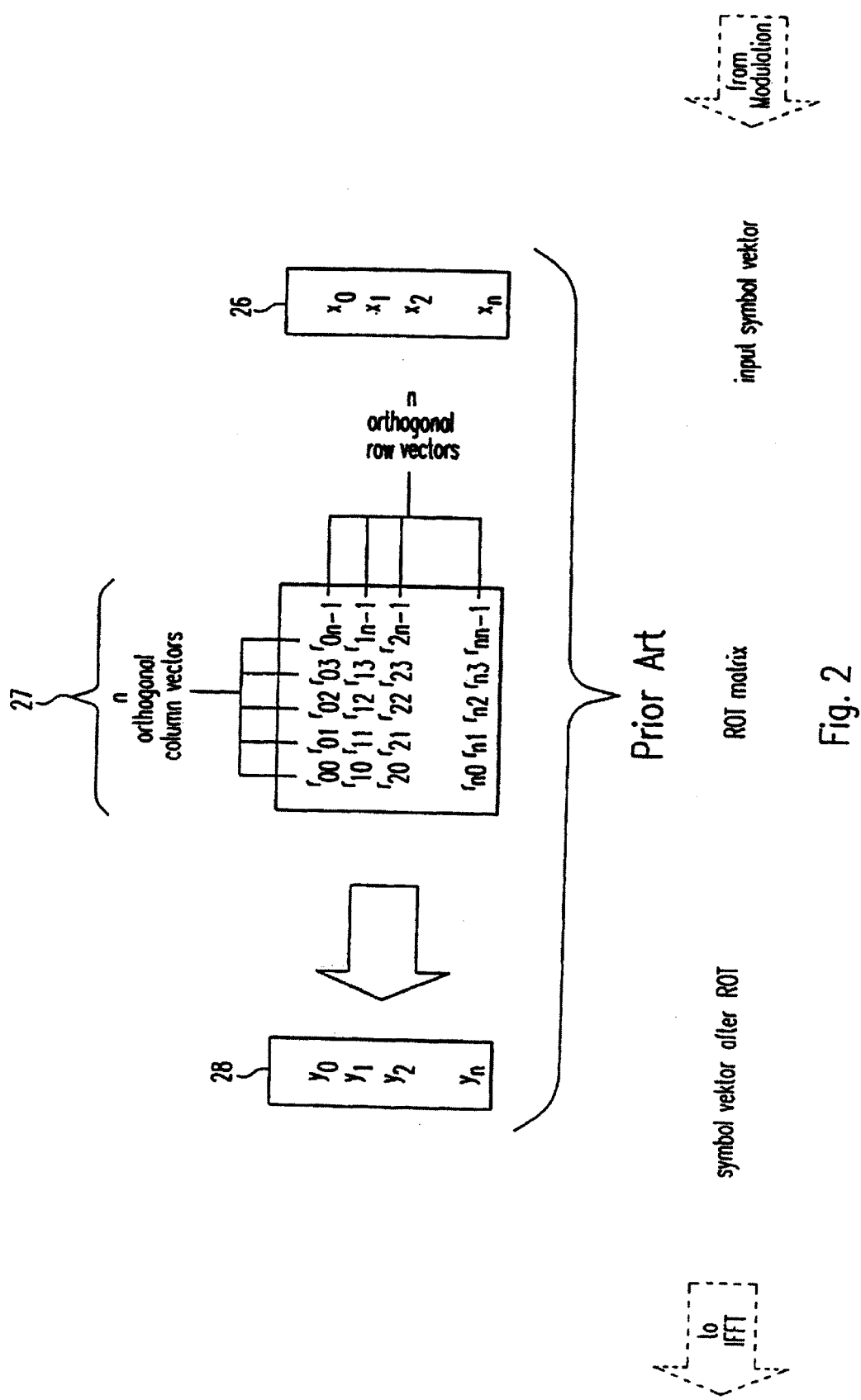
FIG. 2 shows a matrix operation as it is known from EP 98 104 287.2 of Sony corporation, which is only prior art according to Article 54(3) EPC.

FIG. 2 once again shows a ROT-matrix operation according to EP 98 104 287.2. An input symbol vector 26 comprising n data samples and emerging from the modulator 8, e.g. is multiplied with a ROT matrix 27 having n orthogonal column vectors and n orthogonal row vectors. With other words the input symbol vector 26 is multiplied with a square matrix 27. Therefore the ROT-operation generates a symbol vector 28 after the ROT-operation, wherein the transformed symbol vector 28 comprises again n data samples which were passed through a IFFT circuitry 10. ROT therefore is a technique which randomizes information data symbol vectors before the IFFT and the OFDM modulation by an orthogonal matrix. This randomization is untied after FFT, OFDM-demodulation in the receiving side. Interference signals are randomized by another matrix. Therefore some interference is left randomized after untying in the receiving side. The random orthogonal transform is just randomizing interference. As no training sequence or mid-amble is used is used in OFDM, it is difficult to distinguish a wanted signal from an interference signal.

FIG. 3 shows the ROT matrix operation according to the present invention. After the modulation the symbols are divided into a size adapted for the IFFT. The symbols are then treated as a vector of a complex number which size is n. According to the present invention, the input symbol vector 26 is multiplied with a ROT matrix 29 having more rows than columns.

Note: Generally, when the input data are represented as a row vector, the ROT matrix has more columns than rows, and when the input data are represented as a column vector, the ROT matrix has more rows than columns.

Particularly, the number of rows can be m times the number of columns. Therefore the number of symbols is increased by the ROT matrix operation. The number of symbols input to the ROT matrix operation therefore is 1/m of the size of the IFFT(n).

The n column vectors are still mutually orthogonal. However, as there are e.g. 3n row vectors and therefor more row vectors than column vectors, these row vectors are no longer mutually orthogonal. (There are only n orthogonal bases of n element vectors.) By the ROT-matrix operation according to the present invention, in case the input symbol vector 26 comprises n symbols, the symbol vector 28 after the ROT operation will contain more samples, e.g. 3n samples in case orthogonal column vectors and 3n row vectors generate the ROT matrix 29.

It is to be noted, that there are still existing additional (M-n) orthogonal column vectors which are not part of the matrix. These orthogonal but "unwritten" vectors are used to randomize interference.

It is to be noted that the present invention is not limited to binary codes, the values of the vectors can also take higher values, as e.g. 0,1; 1,0; 0,0 or 1,1.

FIG. 4 and FIG. 5 show an example for the generation of the oblong matrices according to the present invention. At first square matrix 31 comprising 3N orthogonal column vectors and 3N orthogonal row vectors is created. Said square matrix 31 is then divided e.g. in three oblong matrices ROT1, ROT2, ROT3. The oblong matrices ROT1, ROT2, ROT3 (29, 29', 29") therefore will still have orthogonal column vectors, however the row vectors can no longer be orthogonal. The m*n columns of the square matrix therefore are divided into m oblong matrices. The matrices ROT1, ROT2, ROT3 satisfy the equation as it is shown in FIG. 7. The m oblong matrices and then be respectively allocated to different base station/mobile station transmission systems. For example the matrix ROT1 can be allocated to a base station 1 and mobile stations belonging to the base station 1, the matrix ROT2 (29') can be allocated to a transmission system comprising a base station 2 and mobile stations belonging to said base station 2, and the oblong matrix ROT3 (29") can be allocated to a transmission system comprising a base station 3 and mobile stations belonging to said base station 3. (see FIG. 5). As it comes clear particularly from FIG. 5 in combination with FIG. 7 if one of said matrices is used in a base station 1 and the other matrix is used in another base station (2 or 3), any interference contributions can be canceled due to the orthogonally between the different matrices 29, 29', 29".

Figure 6:
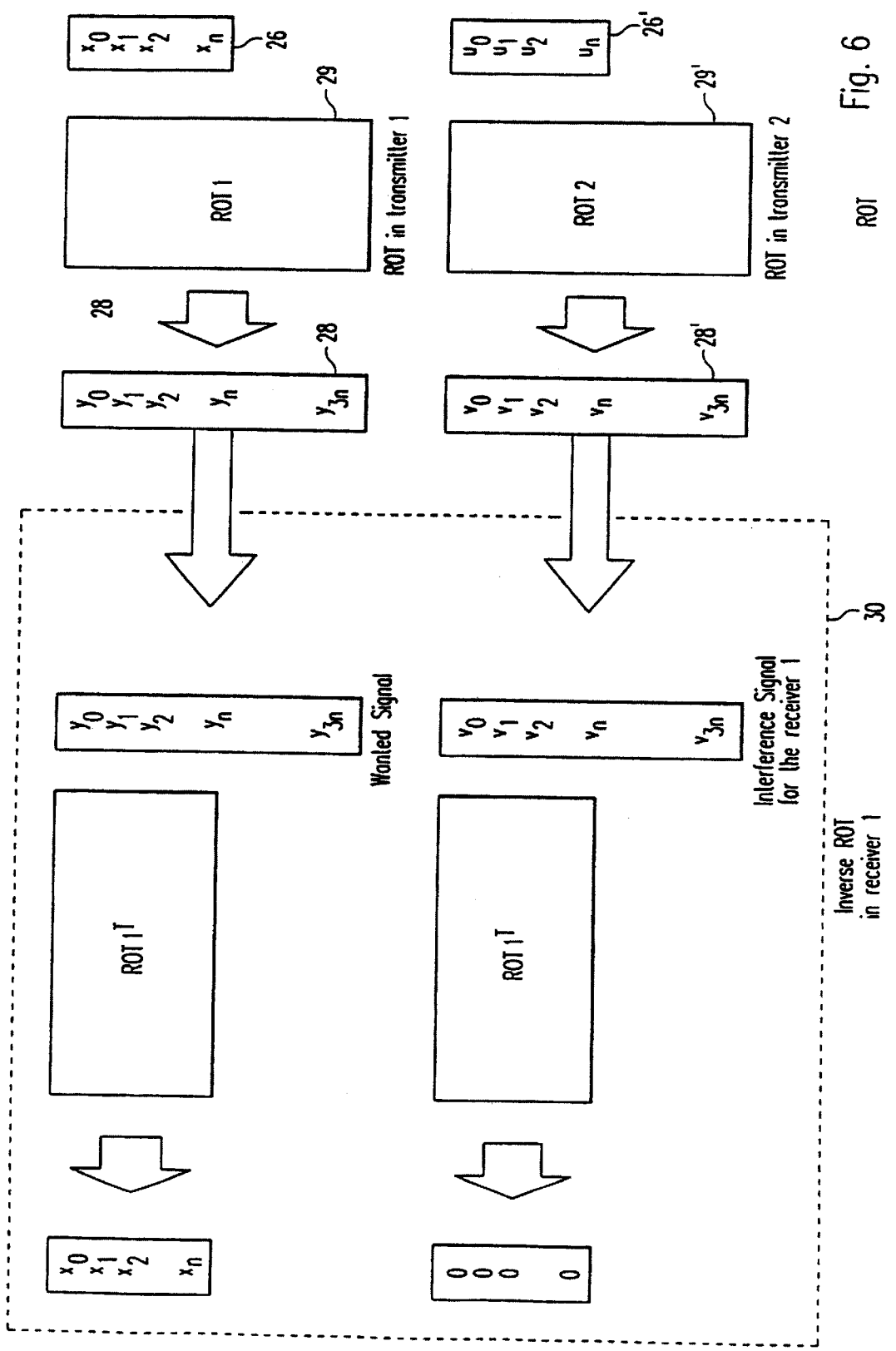
FIG. 6 shows different ROT-operations to explain the interference cancellation effect of the present invention.
Figure 9A:
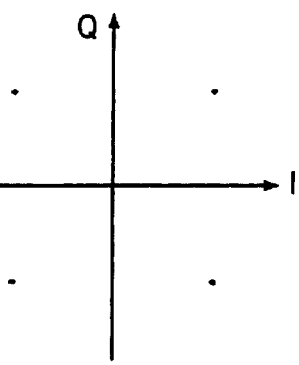
FIGS. 9a to 9c are signal transition views explaining an operation at the time of receiving a sending signal from the communication partner in a radio communication (transmission) system, to which the present invention can be applied.
Figure 10A:
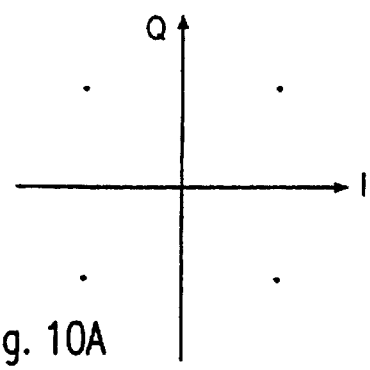
FIGS. 10a to 10c are signal transition views explaining an operation of the time of receiving an interference wave in the radio communication system according to FIG. 8.
Figure 9B:
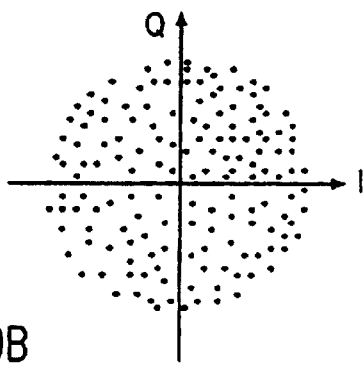
Figure 10B:
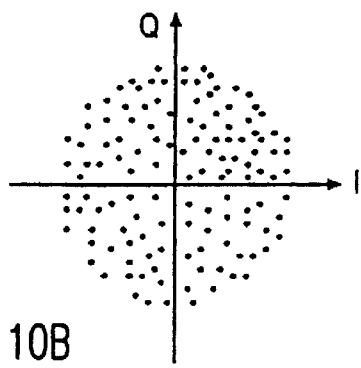
Figure 9C:
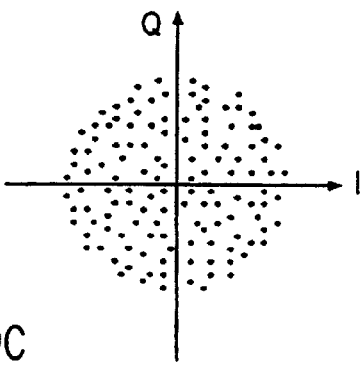
Figure 10C:
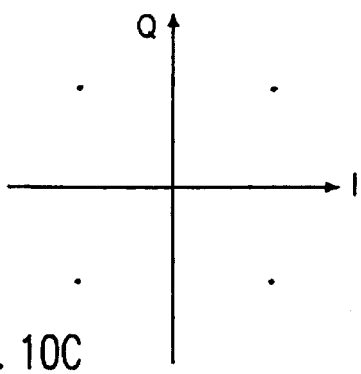

As it comes clear from FIG. 6, in the receiver 30 the randomization can be easily restored by multiplication with a transpose matrix $ROT^T$. The wanted signal is restored by multiplying with a transpose matrix of ROT1. The receiver 30 keeps this matrix $ROT1^t$. Any interference signal which is randomized for example by ROT2 will be canceled by the multiplication procedure with a transpose matrix of ROT1, as ROT2 is orthogonal to ROT1.

It is to be noted that the components of the ROT matrices can also assume complex values.

In actual environment, the channels are not ideal and synchronization between the cells is not complete. In these cases, according to the present invention the interference is not canceled totally, but at least the interference is reduced more efficient than in the case of a randomization procedure as known from EP 98 104 287.2.

According to a further aspect of the present invention, a plurality of mutually orthogonal matrices is used in one base station. With other words, a plurality of mutually orthogonal matrices is allocated to the same base station. The frequency band of OFDM can the be divided by these orthogonal matrices. Therefore, according to this aspect of the present invention, a multiple access technique in OFDM is provided.

In OFDM systems interference symbols can be randomized by different orthogonal matrices, which individually randomize modulated symbols as shown above. Interference can be canceled by using non-square matrices, which randomize symbols orthogonally to each other. Oblong matrices increase the number of symbols after randomizing. According to the above-shown embodiments the increased symbols are only used to keep orthogonality with interference signals.

However, according to still another aspect of the present invention, the multiplication with a ROT matrix can also be used for convolutional coding/decoding. For example a Viterbi algorithm can be used solving the randomization. Therefore, according to this aspect of the present invention, convolutional coding and the ROT matrix technique using oblong matrices is combined. As it is shown in FIG. 11 the original channel coding can therefore be replaced the ROT multiplication operation, which stills keeps orthogonality with the interference signals.

Figure 11:
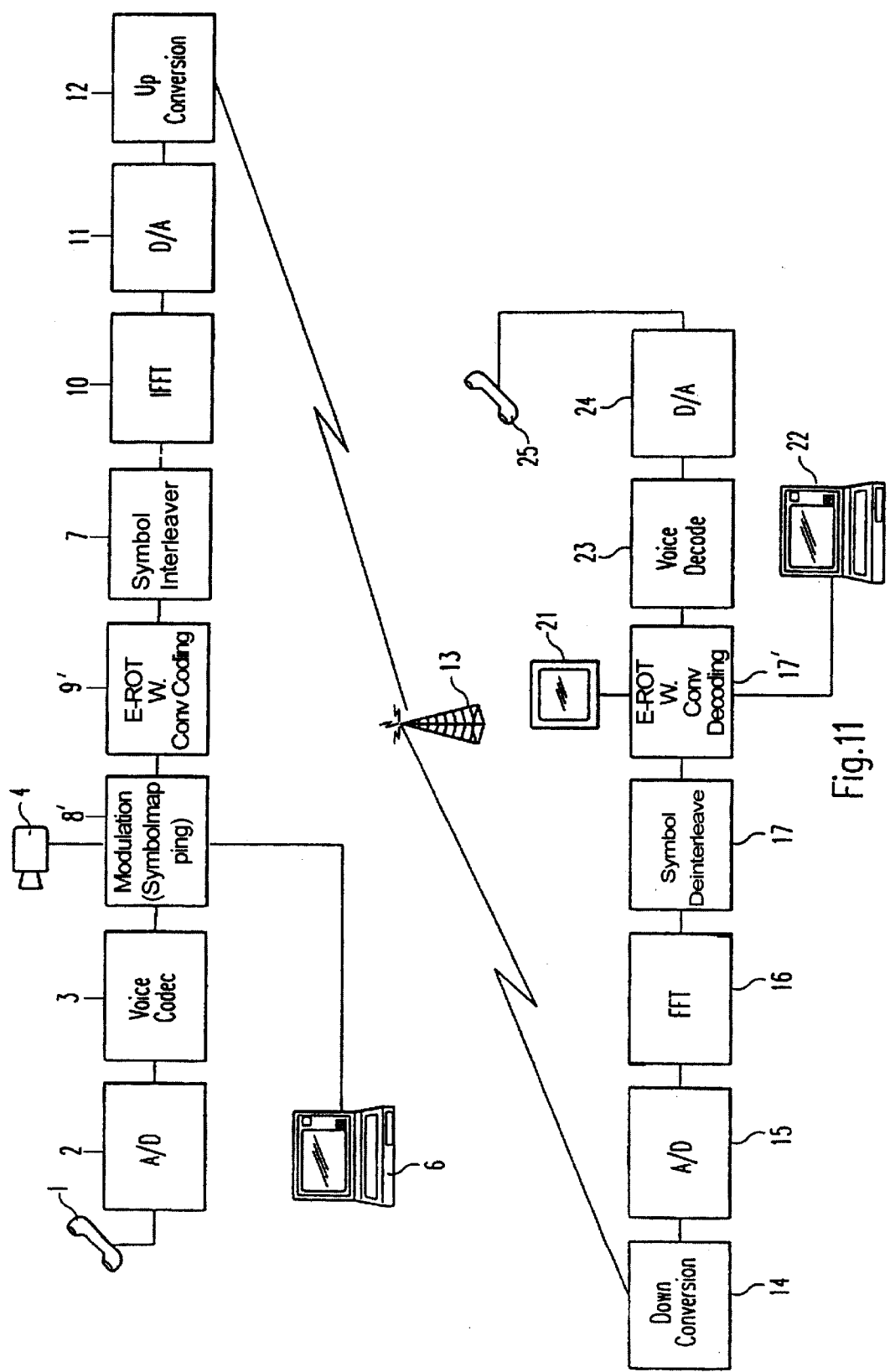
FIG. 11 shows a further embodiment of the present invention, according to which in line with the random orthogonal transform step a convolutional coding/decoding is effected.

As it is shown in FIG. 11, on the transmission side the ROT multiplication unit 9' simultaneously effects the convolutional coding. On the reception side, the unit 17' for multiplicating the deinterleaved symbol with the transpose of the ROT matrix used in the unit 9', simultaneously effects a convolutional decoding operation, such as for example, a Viterbi decoding. After the voice coding in the codec 3 the bit stream on the transmission side is modulated (modulator 8') into complex symbols. Then several symbols are put together into one symbol vector. The symbol vector is multiplied with a ROT matrix modified according to the present aspect of the present invention in the ROT multiplication unit 9'.

FIG. 12 shows a ROT multiplication unit modified according to the present aspect of the invention.

Note:
the matrix A is still an oblong matrix,
the input data are represented by a row (and not by a vector as it is the case in the preceding figures). Therefore the ROT matrix now has more columns than rows. Generally, when the input data are represented as a row vector, the ROT matrix has more columns than rows, and when the input data are represented as a column vector, the ROT matrix has more rows than columns.

Figures 13, 14:
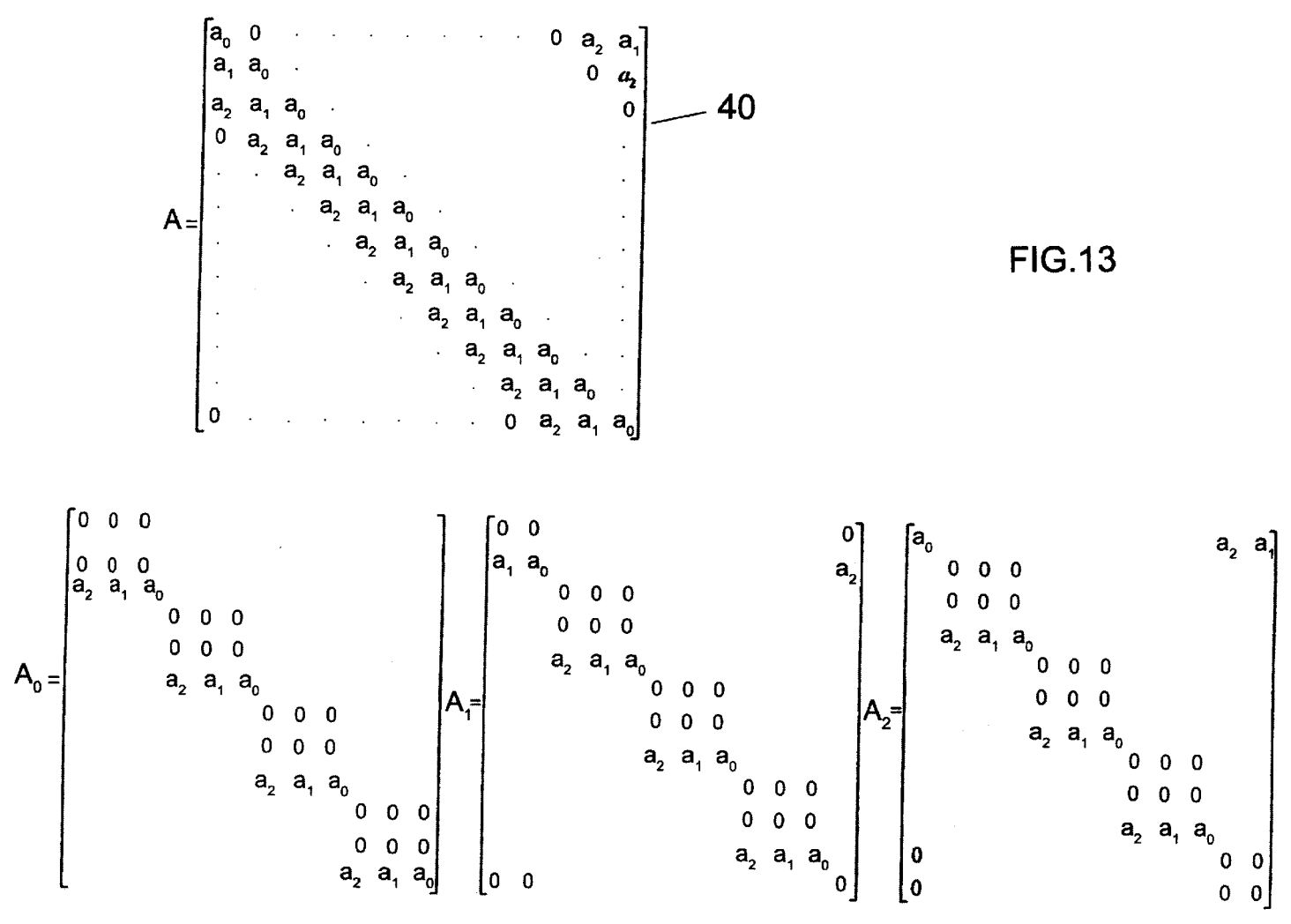

FIG. 13 once again shows a matrix 40 which is a matrix reconstructed from a convolution coding matrix. The matrix A (reference sign 40 in FIG. 13) is then divided into three submatrices $A_0$, $A_1$, $A_2$ (see FIG. 14) which three submatrices $A_0$, $A_1$, $A_2$ are combined together horizontally.

Figure 15:
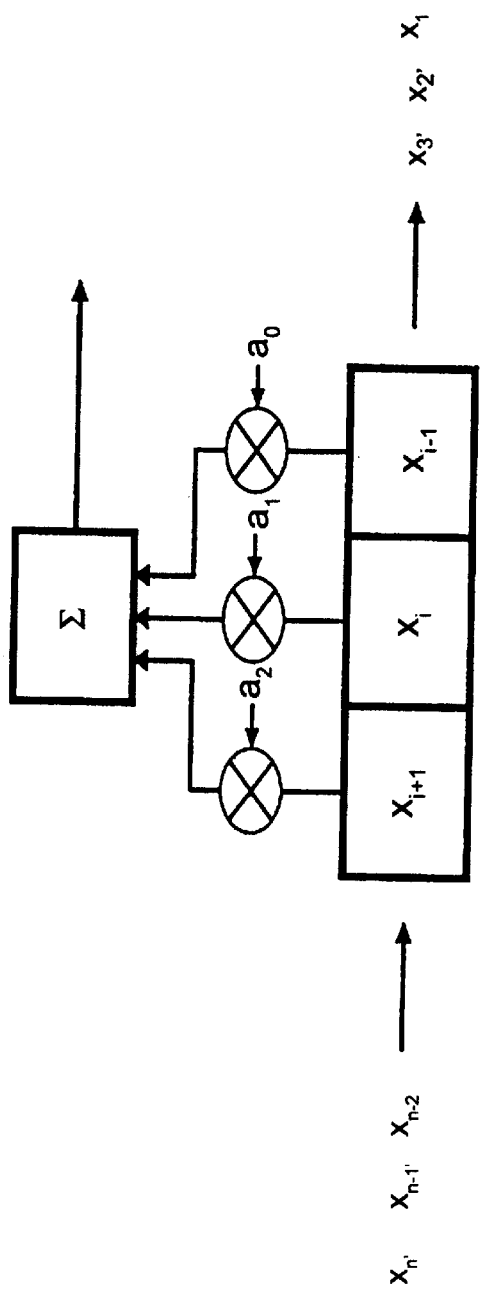
FIG. 15 shows the convolutional coding/decoding process effected by the multiplication with a ROT matrix according to the present invention.

The elements $a_0$, $a_1$, $a_2$ of the convolutional coding matrix A (reference sign 40 in FIG. 13) respectively represent terms of polynomials of a convolution function. The terms cannot only be binary values (e.g. −1, 1), but also real and complex values. The multiplication of the input symbol vector by the matrix A corresponds to the well-known convolution coding operation using a shift register as it is schematically represented in FIG. 15. Instead of shifting input symbols, as it is the case according to the well-known convolution coding procedure, the terms (elements of the matrix A) representing polynomials of the convolution function are already shifted in each column vector (see FIG. 15). Instead of taking a logical EXOR as it is the case in the known convolution coding, according to the present invention the products of respectively a term of the matrix and a symbol are summed along with the multiplication operation of the input symbol vector and the matrix A.

Figure 17:
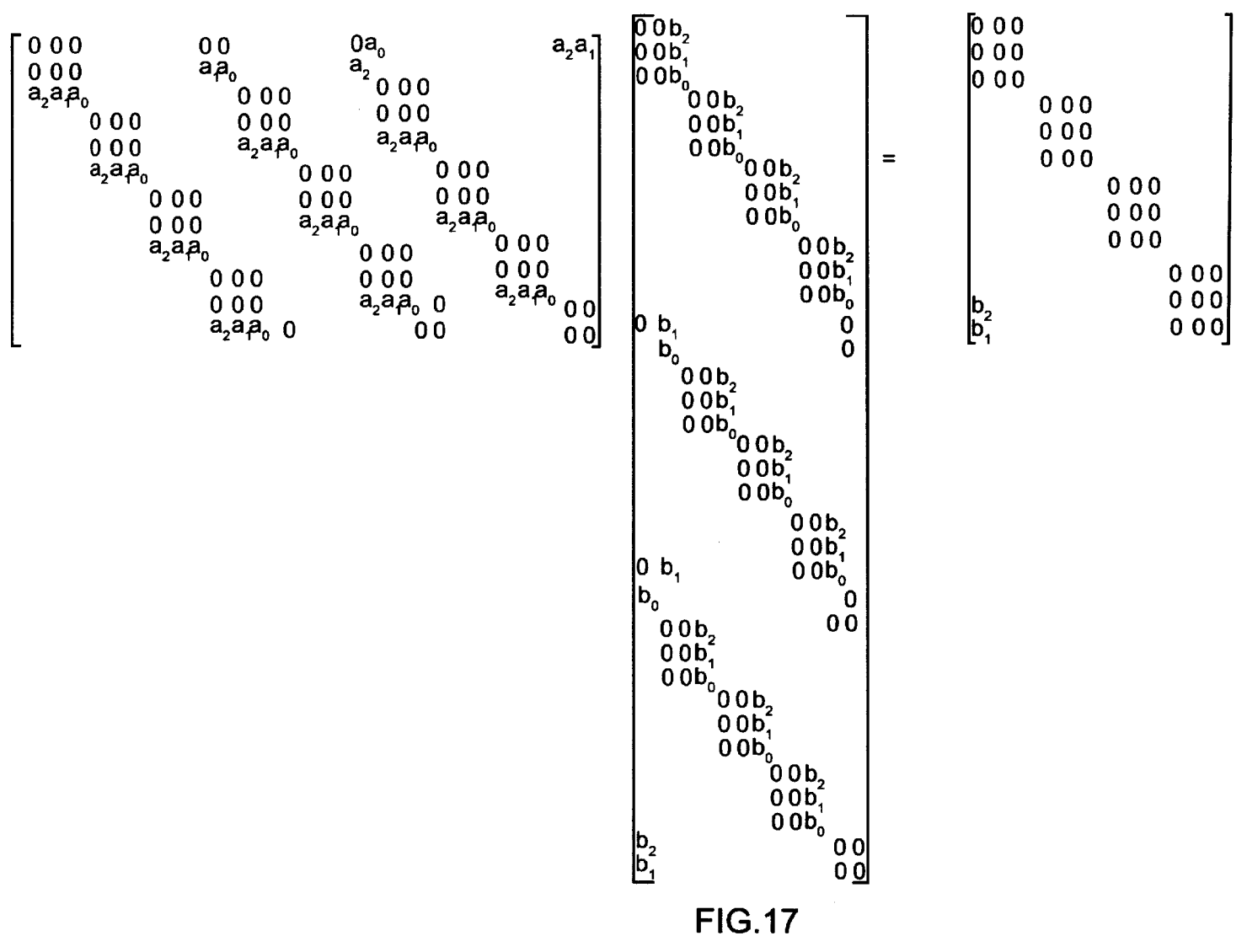

All row vectors of the matrix 40 according to the present invention are orthogonal with each other so that the product of said matrix with a transposed matrix (complex conjugate transposed matrix) is a unit matrix as shown in FIG. 16. All diagonal elements of the unit matrix as shown in FIG. 16 are 1, whereas all other elements of said unit matrix are 0. Therefore the transposed matrix can be used in the unit 17' on the reception side to solve randomization and coding simultaneously. Choosing orthogonal polynomial terms, other ROT matrices can be generated which are respectively orthogonal to the original ROT matrix (see FIG. 17). Therefore interference which is coded by orthogonal ROT matrices can be canceled.

The multiplication of the received symbol vector with the transpose of the matrix used on the transmission side is as shown above one technique to solve simultaneously randomization and convolution coding. Another technique directed on said object is the so-called Trellis technique, which will now be explained with reference to FIGS. 18 to 21.

Figure 21:
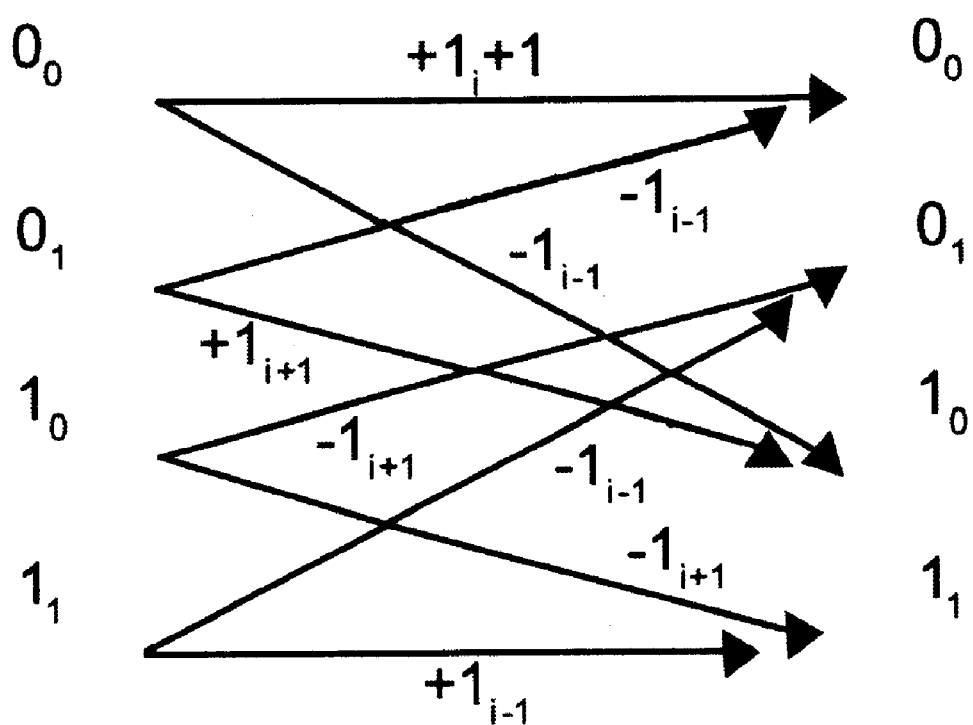
FIG. 21 shows an original Trellis state matrix.

According to the Trellis technique, the elements of the received ROT transformed symbol are summed up as shown in the second equation of FIG. 18 to generate an equivalent vector of xA. The generated equivalent vector xA is composed of n elements $s_0, s_1, \ldots s_{n-1}$ representing respectively a summation result. Using said elements $s_0, s_1, s_{n-1}$ of the equivalent vector xA a state matrix as shown in FIG. 19 is generated. If the modulation scheme is QPSK the number of states $4^{k-1}$, wherein k is the constraint length. Then the path metrics (Hamming distances) of the state matrix using the symbols of equivalent vectors are calculated. Said calculated path metrics are summed up with original state metrics. The original Trellis state matrix is shown in FIG. 21. Respectively the two accumulated metrics of paths leading to a new state (see FIG. 19) are then compared. Finally the received decoded symbol is decided to be the path having the larger path matrix and therefore the higher reliability. With other words, according to the Trellis technique as shown in FIG. 18 to 21, a Viterbi decoding operation is effected using soft decision information, as the metric is calculated by measuring the distance between the received actual symbol and estimated places generated from each state transition (see FIG. 20).

To summarize, the oblong ROT matrix can also be used for convolutional coding/decoding. For example a Viterbi algorithm can be used solving the randomization by a multiplication with a transpose matrix or a Trellis decoding technique. Therefore, according to this aspect of the present invention, convolutional coding and the ROT matrix technique using oblong matrices is combined. As it is shown in FIG. 11 the original channel coding can therefore be replaced the ROT multiplication operation, which stills keeps orthogonality with the interference signals.

What is claimed is:

1. A transmitter for wireless transmission of information data, comprising:
    means for random orthogonal transforming of blocks of data to be transmitted, by a multiplication of a symbol vector comprising the data of one block with a matrix to form a transformed symbol vector, wherein said matrix is comprised of n orthogonal columns, n being the number of data samples in one of said blocks and wherein the length of the symbol vector is different than the length of the transformed symbol vector; and
    means for transmission of data originating from the means for random orthogonal transforming,
wherein the number of rows of said matrix is larger than the number of said columns of said matrix when the data of one block is represented as a column vector, and wherein said matrix is an oblong matrix.

2. The transmitter according to claim 1, wherein the number of rows of said matrix is equal to M*n, n being the number of columns of said matrix and M being an integer larger than one.

3. The transmitter according to claim 1, wherein a modulator is provided for outputting said blocks of data supplied to said means for random orthogonal transforming.

4. The transmitter according to claim 1, wherein the means for random orthogonal transforming supplies the transformed data to an inverse fast Fourier transform circuit.

5. The transmitter according to claim 1, wherein the transmitter is a transmitter of the OFDM type, and the means for random orthogonal transforming of blocks of data to be transmitted are provided with a plurality of mutually orthogonal matrices to provide for a frequency band division according to the OFDM system.

6. The transmitter according to claim 1, further comprising a convolution encoder, wherein the convolution encoder is implemented by reconstructing the matrix from a convolution code matrix.

7. The transmitter according to claim 6, wherein the elements of the matrix are coefficients of polynomials of a convolution function of the convolution encoder.

8. The transmitter according to claim 7, wherein the coefficients of the polynomials are shifted in each column vector of the matrix implementing the convolution encoder.

9. The transmitter according to claim 1, further comprising means for inverse random orthogonal transforming of blocks of data received by multiplying a received data block by a transpose matrix of the matrix used for the data to be transmitted.

10. The transmitter according to claim 1, further comprising means for inverse random orthogonal transforming and convolutional decoding blocks of data received by applying a Trellis decoding technique.

11. The transmitter according to claim 10, wherein said means for inverse random orthogonal transforming and convolutional decoding of blocks of data received comprise:

means for calculating an equivalent vector of a received symbol;

means for generating a Trellis state matrix;

means for calculating path metrics and adding up the calculated path metrics with original state metrics; and means for deciding the decoded symbol by comparing the path metrics of two paths leading respectively to a new state.

12. A transmitting system, comprising a plurality of base stations and a plurality of mobile stations, wherein each mobile station and base station, respectively, comprises a transmitter according to claim 1.

13. A method for the wireless transmission of information data, comprising the following steps:

random orthogonal transforming blocks of data to be transmitted, by a multiplication of a vector comprising the data of one block with a matrix; and transmitting data originating from the step of random orthogonal transforming, wherein for the matrix operation a matrix comprising n orthogonal columns is used, n being the number of data samples comprised in one of said blocks, the number of rows of said matrix is larger than the number of said columns of said matrix, and said matrix is an oblong matrix.

14. The method according to claim 13, wherein the number of rows of said matrix is equal to M*n, n being the number of columns of said matrix and M being an integer larger than one.

15. The method according to claim 13, further comprising the step of modulating data to output said blocks of data being supplied to the step of random orthogonal transforming.

16. The method according to claim 14, further comprising the step of inverse fast Fourier transforming the data emerging from the step of random orthogonal transforming.

17. The method according to claim 16, wherein when receiving the transmitted data, the received data are processed by inverse random orthogonal transforming blocks of said received data by multiplying a received data block by a transpose matrix of the matrix used for the data to be transmitted.

18. A method for convolutional encoding of digital data blocks, comprising the steps according to claim 14, wherein the matrix of the matrix operation step is reconstructed from a convolution code matrix such that the matrix operation step provides both for a random orthogonal transformation and a convolutional encoding.

19. The method according to claim 18, wherein the elements of the matrix are coefficients of polynomials of a convolution function.

20. The method according to claim 19, wherein the coefficients of the polynomials are shifted in each column vector of the matrix of the matrix operation step.

21. A method for decoding digital data blocks encoded according to a method of claim 18, comprising the step of inverse random orthogonal transforming and convolutional decoding blocks of data received by a Trellis decoding technique.

22. The method according to claim 21, wherein said step of inverse random orthogonal transforming and convolutional decoding of blocks of data received comprises:

calculating an equivalent vector of a received symbol;

generating a Trellis state matrix utilizing said vector;

calculating path metrics and adding up the calculated path metrics with original state metrics; and deciding the decoded symbol by comparing the path metrics of the two paths leading respectively to a new state of the Trellis state matrix.

* * * * *